E. KREH.
SPRING HUB WHEEL.
APPLICATION FILED MAY 9, 1912.
1,055,283.
Patented Mar. 4, 1913.
2 SHEETS—SHEET 1.
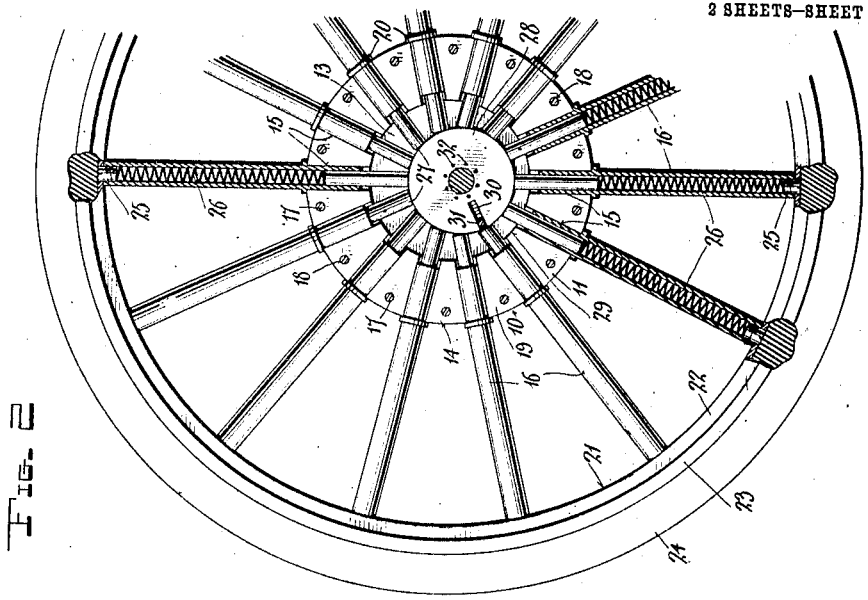
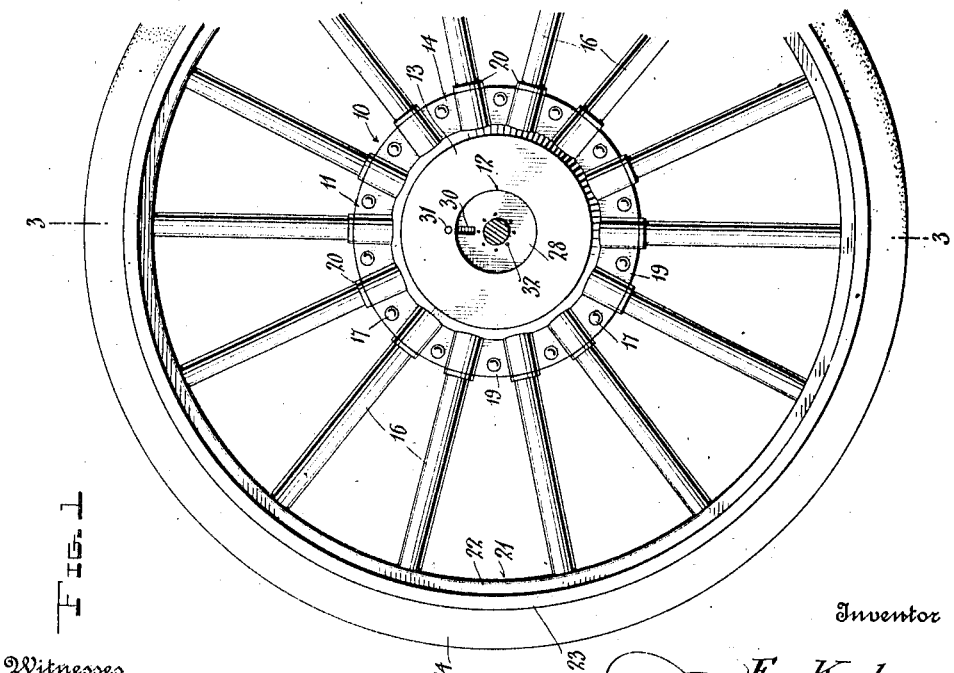

E. KREH.
SPRING HUB WHEEL.
APPLICATION FILED MAY 9, 1912.

1,055,283.

Patented Mar. 4, 1913.
2 SHEETS—SHEET 2.

Witnesses

Inventor
E. Kreh,
By
Attorneys

UNITED STATES PATENT OFFICE.

EUGEN KREH, OF MARE ISLAND, CALIFORNIA.

SPRING-HUB WHEEL.

1,055,283.   Specification of Letters Patent.   Patented Mar. 4, 1913.

Application filed May 9, 1912. Serial No. 696,205.

*To all whom it may concern:*

Be it known that I, EUGEN KREH, a citizen of the United States, residing at Mare Island, in the county of Salano, State of California, have invented certain new and useful Improvements in Spring-Hub Wheels; and I do hereby declare the following to be a full, clear, and exact description of the invention, such as will enable others skilled in the art to which it appertains to make and use the same.

This invention relates to new and useful improvements in spring wheels and more especially to a novel form of spring hub construction therefor.

The primary object of the invention consists in providing a spring wheel having tubular spokes and a hub comprising a pair of plates clamped together to inclose the inner ends of the spokes and to limit the movement of the latter while a resilient bearing element in contained in the hub and supported by resilient means contained in the spokes to absorb shock and vibration during the rotation of the wheel.

Another and important object of the invention is to construct a wheel having spokes containing springs having plungers normally forced inwardly and movably engaged with the peripheral face of an axle receiving element for permitting movement of the latter to absorb shock during the travel of a wheel over an uneven road surface, the axle receiving element being held from rotation while the rim of the wheel is provided for readily renewing the springs or supporting a solid rubber or other tread so as to dispense with pneumatic tires.

Figure 6:
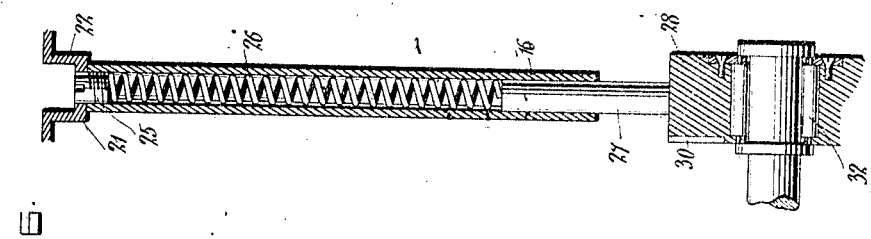
Figure 4:
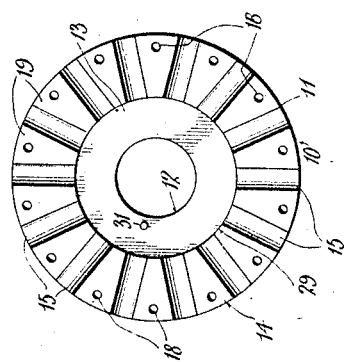
Figure 5:
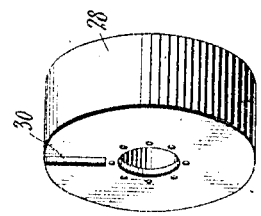
Figure 3:
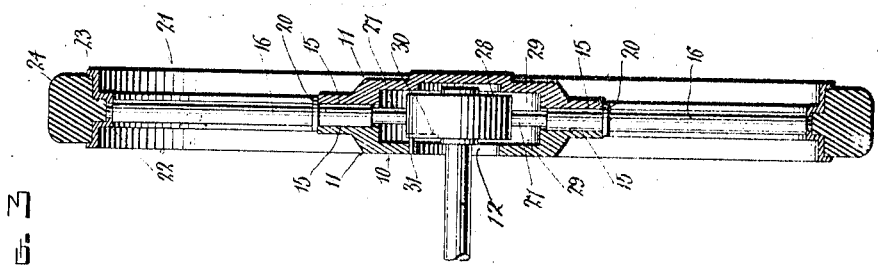

With these and other objects in view, the invention consists of certain other combinations and arrangements of parts as will be hereinafter more fully described, claimed and illustrated in the accompanying drawings, in which:

Figure 1 is a side elevation of a fragmentary portion of my improved spring wheel. Fig. 2 is a similar view but showing one side plate of the hub removed and several of the spokes in section to illustrate the action of the spring hub under a load. Fig. 3 is a sectional view of the wheel taken on the line 3—3 of Fig. 1. Fig. 4 is an inside face view of one of the plates forming the hub. Fig. 5 is a detail perspective view of the bearing member of the axle. Fig. 6 is an enlarged sectional view of one of the spokes and part of the rim and hub of the wheel.

As shown, my improved wheel comprises a hub 10 the same being formed of a pair of circular plates 11, the outermost one being closed while the inner plate is provided with an opening 12 centrally thereof for receiving a vehicle axle. The plates 11 are each provided with offset central portions 13 and surrounding inset flanges 14 provided with a plurality of equi-distantly spaced and radially extended semi-circular recesses 15 coacting to receive the inner ends of a corresponding number of tubular spokes 16.

The plates 11 are clamped together by means of screws 17 engaged in coacting or registering threaded apertures 18 in the intermediate portions 19 of the flanged portions of the plates located between the concaved portions 13 thereby securely holding the inner ends of the spokes to the hub while said spokes are limited from inward displacement by means of shoulders 20 which engage the peripheral edges of the plates. A rim 21 is secured to the outer ends of the spokes in the usual manner except that said rim has a central reinforcing rib 22 extending inwardly and side flanges 23 for the retention of a solid rubber or other cushion tread 24 on the rim.

The outer ends of the spokes are closed by screw threaded taps or plugs 25 which operate through threaded openings in the rim and serve to retain coiled expansion springs 26 within the spokes and which resiliently act at their inner ends against solid spoke sections or plungers 27 so as to normally hold the latter in engagement with the peripheral face of a disk-shaped or circular bearing member 28 for a vehicle axle. The plates 13 are interiorly bored or hollowed out as shown at 29 to movably receive the bearing member 28 therein and in contact with the inner faces of the hollowed out portions of the plates so that the axle is resiliently supported by the springs when engaged through said bearing member. From a further inspection of the drawings, it will also be seen that the inner ends of the spokes 26 terminate outwardly of the surrounding inner walls of the plates 11 and the solid spoke sections or plungers 27 project therefrom and into the hollowed out portions of the plate to cause expansion or compression of the springs according to their position above or below the hub as the wheel rotates under a load by engagement of the bearing member against the inner ends of said solid spoke sections or plungers. One face of the bearing member or disk 28 is provided with a radial groove 30 for receiving a set pin 31 to prevent rotation of the bearing member independently of the hub plates and wheel during the rotation of the latter. The bearing member is also provided with interior roller bearings 32 to reduce friction on the axle.

From the foregoing description in connection with the accompanying drawings, it will be seen that I have provided a very efficient spring wheeled structure and more especially a spring hub therefor and it will be apparent that by removing the taps or plugs 25 the springs 26 or the solid spoke sections or plungers 27 may be renewed when necessary. It will further be apparent that a hub constructed in accordance with the invention will absorb all shocks incident to the travel over uneven road surfaces and thus permit the use of solid cushion tires or greatly lengthen the life of pneumatic tires.

I claim:

1. In a spring wheel, the combination with a rim having a tread member and a plurality of openings therethrough; of tubular spokes connected to the rim at the openings, plugs closing the openings and the outer ends of the spokes, a hub comprising a pair of plates clamped together and having coacting semi-circular portions receiving the inner ends of the spokes, an axle receiving bearing mounted between the plates and freely movable therein vertically but held against rotation, plungers projecting from the inner ends of the spokes to engage the bearing member and springs mounted in the spokes between the plugs and the plunger to force the latter against the bearing member.

2. In a spring wheel, the combination with a rim having a tread member and a plurality of openings therethrough; of tubular spokes connected to the rim at the openings, plugs closing the openings and the outer ends of the spokes, a hub comprising a pair of plates clamped together and having coacting semi-circular portions receiving the inner ends of the spokes, an axle receiving bearing mounted between the plates and freely movable therein vertically but held against rotation, plungers projecting from the inner ends of the spokes to engage the bearing member, springs mounted in the spokes between the plugs and the plunger to force the latter against the bearing member, said plates being interiorly hollowed out and enlarged relative to the bearing member and shoulders carried by the spokes to engage the peripheral edges of the plates and prevent inward displacement of the spokes.

In testimony whereof, I affix my signature, in presence of two witnesses.

EUGEN KREH.

Witnesses:
 CHARLES WESTERMANN,
 HARLIN V. GREENWOOD.